United States Patent
Brimley et al.

(10) Patent No.: US 11,220,444 B2
(45) Date of Patent: Jan. 11, 2022

(54) SYSTEM FOR MONITORING OPERATION OF THICKENERS AND CLARIFIERS

(71) Applicant: OVIVO INC., Montreal (CA)

(72) Inventors: Russell Brimley, Salt Lake City, UT (US); Todd Robert Kline, Salt Lake City, UT (US); Daniel Ricsi, Salt Lake City, UT (US); Clay Holt, Salt Lake City, UT (US); Tor Magne Heimdal, Austin, TX (US)

(73) Assignee: OVIVO INC., Montreal (CA)

( * ) Notice: Subject to any disclaimer, the term of this patent is extended or adjusted under 35 U.S.C. 154(b) by 0 days.

(21) Appl. No.: 17/000,931

(22) Filed: Aug. 24, 2020

(65) Prior Publication Data

US 2021/0061685 A1    Mar. 4, 2021

Related U.S. Application Data

(60) Provisional application No. 62/893,898, filed on Aug. 30, 2019.

(51) Int. Cl.
*C02F 1/52* (2006.01)
*C02F 1/00* (2006.01)

(52) U.S. Cl.
CPC .............. *C02F 1/52* (2013.01); *C02F 1/001* (2013.01); *C02F 2201/002* (2013.01); *C02F 2209/00* (2013.01)

(58) Field of Classification Search
USPC ......... 210/600, 614–618, 761, 621–626, 528
See application file for complete search history.

(56) References Cited

U.S. PATENT DOCUMENTS

| | | | |
|---|---|---|---|
| 5,948,261 A * | 9/1999 | Pressley ................ | B01F 5/0413 210/609 |
| 6,719,903 B1 * | 4/2004 | Pressley .............. | B01F 13/1013 210/613 |
| 9,339,743 B2 * | 5/2016 | Vorwaller .......... | B01D 21/0018 |
| 2016/0107209 A1 * | 4/2016 | Braun ................... | C02F 11/127 241/15 |
| 2017/0226646 A1 * | 8/2017 | Nourbakhsh ......... | C02F 1/4606 |
| 2018/0297862 A1 * | 10/2018 | Nourbakhsh ............ | C02F 1/46 |
| 2020/0038782 A1 * | 2/2020 | Bose ..................... | B01D 21/30 |

FOREIGN PATENT DOCUMENTS

CN    1049915    * 10/2015    ............. G05B 19/05

OTHER PUBLICATIONS

English Translation CN 104991511, published Oct. 21, 2015 (Year: 2015).*

* cited by examiner

*Primary Examiner* — Nina Bhat
(74) *Attorney, Agent, or Firm* — R. Neil Sudol; Henry D. Coleman

(57) ABSTRACT

A thickener/clarifier system includes a thickener/clarifier and one or more sensors measuring respective process or operating parameters of the thickener/clarifier(s) during operation thereof. The sensors are operatively coupled via hard-wired connections and possibly via 4-20 mA converters to one or more wireless transmitters. At least one wireless receiver receives the wireless signal(s) from the transmitter(s). At least one display is hard-wire coupled to the receiver(s) for displaying a magnitude of each process or operating parameter measured.

13 Claims, 2 Drawing Sheets

SYSTEM FOR MONITORING OPERATION OF THICKENERS AND CLARIFIERS

BACKGROUND OF THE INVENTION

This invention relates to systems for monitoring the operation of thickeners and clarifiers, or thickener/clarifiers. More particularly, this invention relates to systems for monitoring process and operational parameters of thickener/clarifiers.

Thickeners and clarifiers, particularly of the deep bed type, are used to separate liquid and solid particles from a slurry or suspension. Thickeners and clarifiers have slowly rotating rake arms to separate solid particulate. A liquid feed with suspended solids is fed into a tank with a diameter of 5 to 500 feet. As the particles settle, angled rake arms move the concentrated slurry toward the center of the tank, where it is removed. Clear liquid overflows the top of the tank and is collected in a trough.

There are three main types of thickener/clarifiers: bridge support, column support, and traction. In a bridge support thickener, such as the one shown below, the rakes and drive mechanism are suspended from a bridge that spans the diameter of the tank. After large objects and grit have been screened out of the water, raw wastewater is fed into the primary clarifier. In this stage, floating material and material that easily settles out will be removed, resulting in a homogeneous effluent that can be further treated biologically in the secondary clarifier, and a sludge discharge that can be treated or processed.

In column support thickeners, such as the one shown below, the drive and raking mechanisms are attached to a central column. Typically the center column also acts as the influent pipe for the clarifier. In some cases, the feed enters through an overhead pipe supported by an access bridge that leads to the center column.

Traction units also have a center column, but the drive power is supplied by a trolley that rides along a track at the tank wall, traction drive units are able to efficiently provide a very high amount of torque for high demand applications.

Deep bed thickeners and clarifiers (or so-called thickener/clarifier devices) are shown and described, for example, in U.S. Pat. Nos. 6,758,978, 5,433,862, 5,549,827 and 5,800,715, the disclosures of which are hereby incorporated by reference. Deep bed thickener/clarifiers offer certain design and operational advantages over the conventional thickeners and clarifiers while providing clarity of overflow and solids concentration of underflow comparable to that of conventional thickener/clarifiers. Such thickeners and clarifiers are typically of low-profile design (i.e., shorter in height but of much greater diameter than deep bed thickeners), but like deep bed thickeners have generally central feedwells and underflow underflow discharge ports.

Where operating or process parameters of thickeners/clarifiers are centrally monitored, the systems include various dedicated sensors for measuring respective operating or process parameters, including speed of rake arm rotation and torque applied to the arms by a rotary drive. The sensors are typically of an analog variety where the output signals are between 4 and 20 mA. The sensor output signals are transmitted to a central location via conductors housed in conduit. At the central location the signals are fed to respective gauge displays for human supervision.

When a thickeners/clarifier is of a traction type with a peripheral drive that runs on the perimeter of the thickeners/clarifier tank rather than at the center of the tank, torque monitoring poses a challenge. Visual torque monitoring systems that are located at the drive are not practical because the drive is constantly moving around the tank. Thus it is necessary to have a visual torque monitor outside the tank, away from the moving drive. This will require a signal to be sent from the moving drive to the stationary torque monitor. The obvious solution, to send a signal through a slip ring, gives rise to several problems as to signal noise and reliability.

When new plants are constructed in mountainous areas or on other irregular terrain, it may be difficult and expensive to lay in conduit for signal transmission. Plants existing in such geographically difficult circumstances may wish to upgrade their signal processing and operations monitoring, for instance, to include a Supervisory Control and Data Acquisition (SCADA) system the difficulties of installation are again encountered, to connect the sensors to control panels and/or motor control centers (MCC). The retrofits can be labor-intensive, time-consuming and expensive.

SUMMARY OF THE INVENTION

The present invention seeks an improved process-parameter monitoring system that provides a solution to problems discussed above.

A system for separating solids and liquids of a slurry or suspension from one another comprises, in a preferred embodiment of the invention, at least one thickener/clarifier, at least one sensor, at least one signal converter, at least one wireless transmitter, at least one receiver and at least one display. The sensor is positioned for measuring a process parameter or operating parameter of the thickener/clarifier during operation thereof. The signal converter is operatively coupled via a hard-wired connection to the sensor for converting an output signal thereof to a secondary signal of a predetermined coding format. The wireless transmitter is operatively coupled via a hard-wired connection to the signal converter for transmitting the secondary signal as a wireless signal. The wireless receiver receives the wireless signal from the transmitter. The display is operatively coupled via a hard-wired connection to the receiver for displaying a magnitude of the process parameter or operating parameter measured by the sensor. The predetermined coding format is preferably a 4-20 mA analog coding.

A system for separating solids and liquids of a slurry or suspension from one another comprises, in accordance with another embodiment of the present invention, at least one thickener/clarifier, a plurality of sensors, at least one wireless transmitter, at least one wireless receiver and at least one display. The sensors are configured and positioned for measuring respective process or operating parameters of the thickener/clarifier during operation thereof and generating respective output signals encoding magnitudes of the process or operating parameters. The one or more wireless transmitters are operatively coupled via hard-wired connections to the signal converters for transmitting one or more wireless signals carrying the process magnitudes in an encoded form. The one or more wireless receivers receive the wireless signal(s) from the transmitter(s). The one or more displays are operatively coupled via hard-wired connections to the receiver(s) for displaying the magnitudes of the process parameters.

Pursuant to another feature of the present invention, the one or more wireless transmitters transmit the process magnitudes via signals of different frequencies.

Preferably, the system includes a plurality of transmitters equal in number to the sensors, each of the transmitters being hard-wire connected at an input to a respective one of the sensors.

Preferably, signals fed to the transmitter(s) from the various sensors are 4-20 mA analog coded signals.

The thickener/clarifier typically includes a tank, a rake submerged in the tank, and a drive rotating the rake in a circular path in the tank. The process or operating parameters then include torque exerted by the drive and speed of rotation of the rake.

The at least one display may be one of a plurality of display meters disposed at a single location, the display meters being operatively coupled via respective hard-wired connections to the receiver(s) for displaying respective ones of the magnitudes.

A system for separating solids and liquids of a slurry or suspension from one another comprises, pursuant to another embodiment of the invention, at least one thickener/clarifier, a plurality of sensors measuring respective process or operating parameters of the thickener/clarifier during operation thereof, and a plurality of signal converters operatively coupled via respective hard-wired connections to respective ones of the sensors for converting output signals thereof to secondary signals of a predetermined coding format. The system further comprises a plurality of wireless transmitters operatively coupled via hard-wired connections to respective ones of the signal converters for transmitting the secondary signals as respective wireless signals. At least one wireless receiver is provided for receiving the wireless signals from the transmitters, and a plurality of digital display meters are operatively coupled via hard-wired connections to the receiver for displaying magnitudes of respective ones of the process or operating parameters measured by the sensors.

The present invention provides a process-parameter monitoring system the installation of which is less labor-intensive, time-consuming and expensive than current systems. The incorporation of wireless signal transmission components eliminates the necessity of installing conduit, cables and wiring around a plant and is especially advantageous in difficult terrain. Moreover, wireless transmission facilitates the collection of signals from the rotating peripheral drives. The signals are clean and reliable, devoid of signal noise which frequently arises from slip-ring connections.

DETAILED DESCRIPTION

Figure 1:
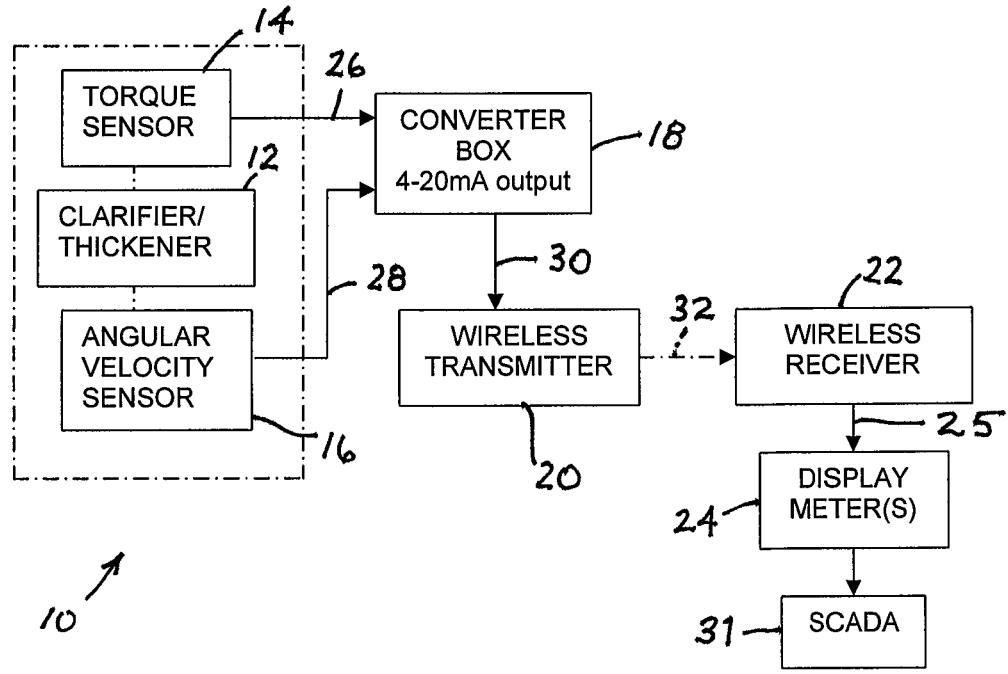
FIG. 1 is a block diagram showing a thickener/clarifier system in accordance with the present invention.

As depicted in FIG. 1, a system 10 for separating solids and liquids of a slurry or suspension from one another comprises a thickener/clarifier 12 and two sensors 14 and 16, at least one signal converter 18, at least one wireless transmitter 20, at least one receiver 22 and at least one display 24. Sensors 14 and 16 are configured and positioned for measuring respective process parameters such as torque output of a rotary drive unit (not illustrated) and angular velocity of a rake structure (not shown).

Signal converter 18 is operatively coupled via a hard-wired cable connections 26 and 28 to sensor 14 and 16 and is operative to convert sensor output signals to one or more secondary signals of a predetermined coding format. Particularly contemplated is a 4-20 mA analog coding.

Wireless transmitter 20 is operatively coupled via a hard-wired cable connection 30 to signal converter 18 for transmitting the secondary signal as a wireless signal 32. Receiver 22 receives the wireless signal 32 from transmitter 20.

Display 24 may be a display that includes two digital meters or gauges. Display 24 is operatively coupled via a hard-wired cable connection 25 to receiver 22 for displaying a magnitude of the process or operating parameters of torque and rotational velocity as measured by sensors 14 and 16. The torque and velocity signals may be forwarded to a supervisory control and data acquisition system 31 (SCADA).

Figure 2:
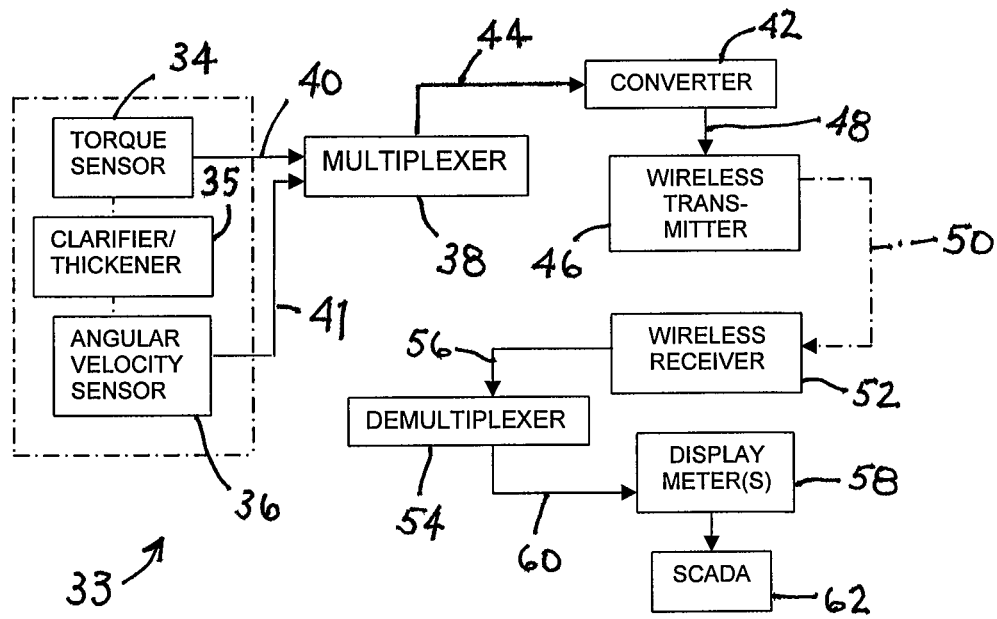
FIG. 2 is a block diagram showing another thickener/clarifier system in accordance with the present invention.

FIG. 2 shows another configuration of a thickener/clarifier system 33 with wireless signal transmission components for monitoring the operational status of a thickener/clarifier 35. As in the system of FIG. 1, two sensors 34 and 46 are configured and positioned on or in juxtaposition to operational components of the thickener/clarifier 33 for measuring torque output of a rotary drive unit (not illustrated) and angular velocity of a rake structure (not shown). Sensors 34 and 36 are connected at outputs to a multiplexer 38 via hard-wired cable lines 40 and 41. Multiplexer 38 is in turn coupled at an output to a signal converter 42 via a cable link 44. Converter 42 outputs a multiplexed signal of desired format (e.g., 4-20 mA analog coding) to a wireless transmitter 46 via a hard wire or cable 48. Transmitter 46 emits a wireless signal 50 that encodes torque and velocity magnitudes as measured by sensors 34 and 36.

A wireless receiver 52 receives the wireless signal 50 from transmitter 46 and passes the signal on to a demultiplexer 54 via a cable 56. Demultiplexer 54 distributes the signals respectively encoding torque and angular velocity magnitudes to a display 58 via one or more hard-wires or cables 60. Display 58 may include a plurality of digital meters or gauges disposed at a single location (e.g., on a post or wall). The torque and velocity signals may be forwarded to a supervisory control and data acquisition system 62 (SCADA).

Figure 3:
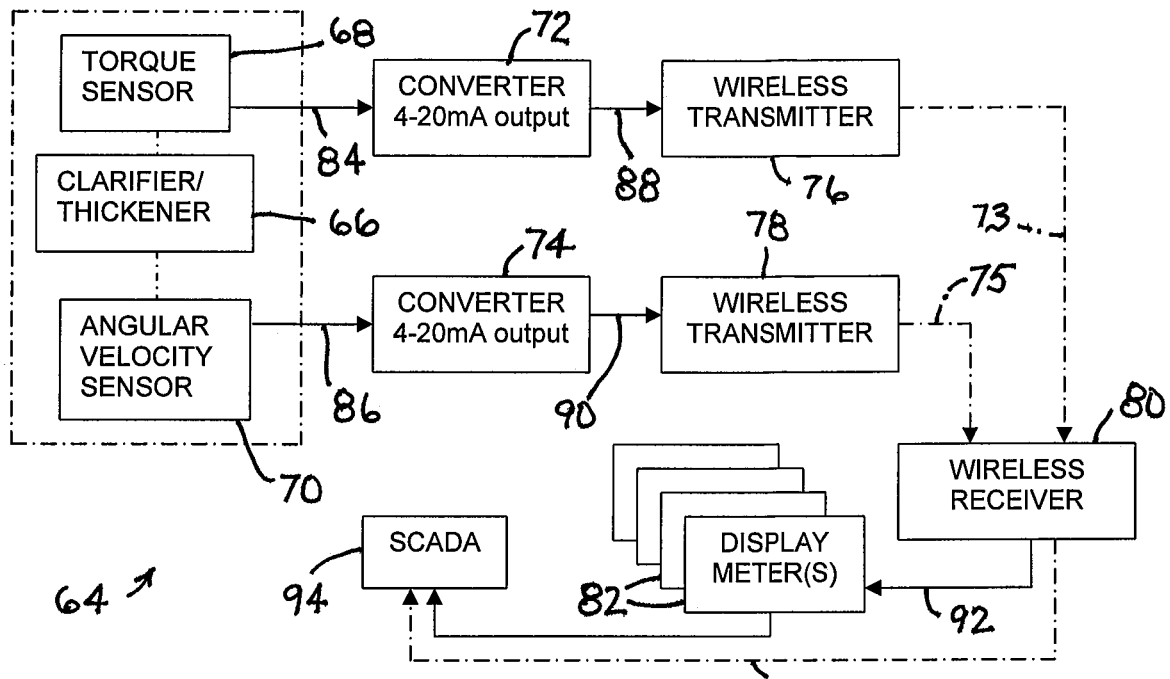
FIG. 3 is a block diagram showing a further thickener/clarifier system in accordance with the present invention.

FIG. 3 depicts a modified thickening/clarification system 64 for separating solids and liquids of a slurry or suspension from one another. The system 64 comprises at least one thickener/clarifier 66, a plurality of sensors 68 and 70, two converters 72 and 74, two wireless transmitters 76 and 78, at least one wireless receiver 80 and one or more displays 82. Thickener/clarifier 66 typically includes a tank, a rake disposed in the tank, and a drive (none shown) rotating the rake in a circular path in the tank. The process or operating parameters then include torque exerted by the drive and speed of rotation of the rake.

Sensors 68 and 70 are configured and positioned for measuring respective process or operating parameters of the thickener/clarifier 66 during operation thereof and generating respective output signals encoding magnitudes of the process or operating parameters of torque and rake rotation speed.

Signal converters 72 and 74 are operatively coupled via hard-wired cable connections 84 and 86 to sensors 68 and 70 and are operative to convert sensor output signals thereof to one or more secondary signals of a predetermined coding format such as 4-20 mA analog coding.

Wireless transmitters 76 and 78 are operatively coupled via hard-wired connections 88 and 90 to the signal converters 72 and 74 for transmitting one or more wireless signals 73 and 75 carrying the process magnitudes in an encoded form. Wireless receiver 80 receives the wireless signals from the transmitters 76 and 78. The one or more displays 82 are operatively coupled via hard-wired connections 92 to the receiver 80 for displaying the magnitudes of the process parameters.

System 64 thus includes a plurality of transmitters 67 and 78 equal in number to the sensors 68 and 70, each of the transmitters being hard-wire connected at an input to a respective one of the sensors. Preferably, signals fed to the transmitter(s) from the various sensors are 4-20 mA analog coded signals. Transmitters 76 and 78 transmit the process magnitudes via signals of different frequencies.

The torque and velocity signals may be relayed to a supervisory control and data acquisition system 94 (SCADA) from the display(s) 82 or may be forwarded directly from the wireless receiver 80 via a dedicated link 96.

Figure 4:
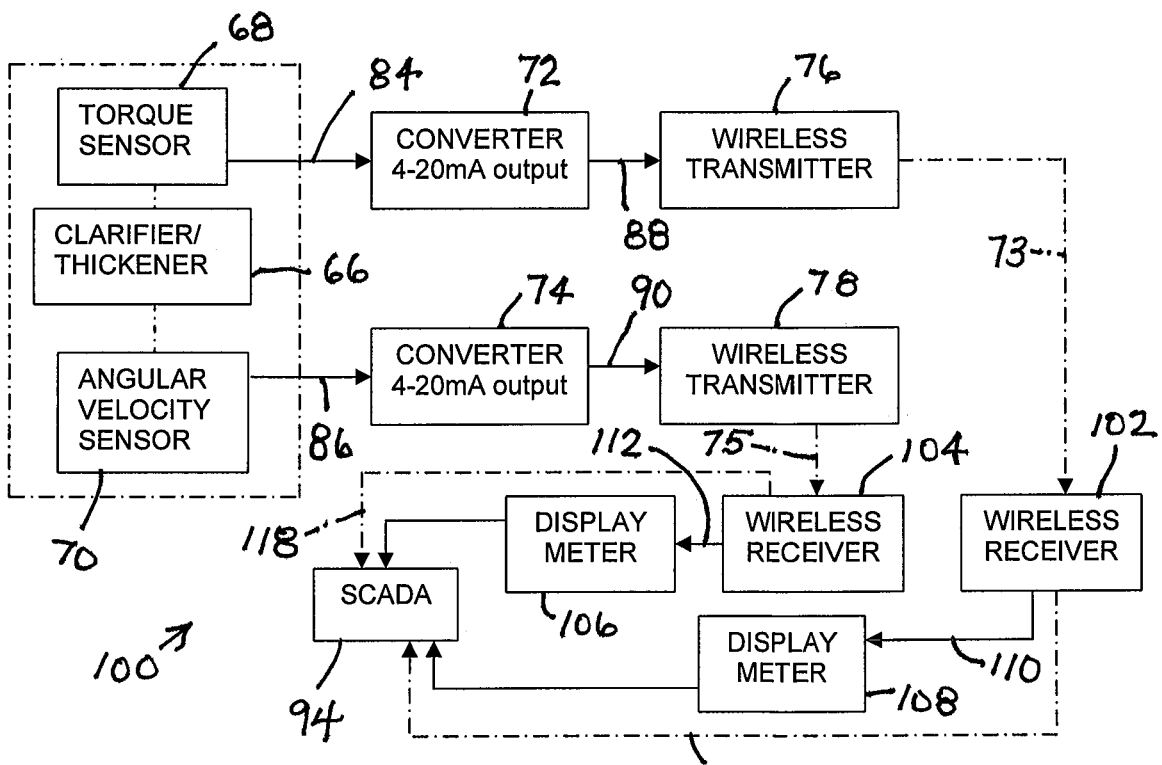
FIG. 4 is a block diagram showing yet another thickener/clarifier system in accordance with the present invention.

FIG. 4 depicts a thickening/clarification system 100 which is a modification of thickening/clarification system 64 of FIG. 3. The system 100 comprises some of the same components which are designated by the same reference numerals: at least one thickener/clarifier 66, sensors 68 and 70, converters 72 and 74, and transmitters 76 and 78. System 100 includes a plurality of wireless receivers 102 and 104 equal in number to sensors 68 and 70 and concomitantly converters 72 and 74, and transmitters 76 and 78. System 100 further includes an equal number of displays 106 and 108 each operatively connected via Wireless receivers 102 and 104 receive the wireless signals 73 and 75 from respective ones of the transmitters 76 and 78. Displays (e.g., digital meters) 106 and 108 are operatively coupled via hard-wired connections 110 and 112 to receivers 102 and 104, respectively, for displaying the magnitudes of respective process parameters, toque and rotational speed.

System 100 thus includes a plurality of transmitters 67 and 78 and a like plurality of receivers 102 and 104, both equal in number to the sensors 68 and 70, each of the transmitters being hard-wire connected at an input to a respective one of the sensors. Preferably, signals fed to transmitters 76 and 78 from sensors 68 and 70 are 4-20 mA analog coded signals. Transmitters 76 and 78 transmit the process magnitudes via signals of different frequencies.

The torque and velocity signals may be relayed to supervisory control and data acquisition system 94 (SCADA) from displays 106 and 108 or may be forwarded directly from the wireless receivers 102 and 104 via dedicated links 116 and 118.

The transmitter and receiver components disclosed herein may be implemented by off-the-shelf products. For instance, transmitters 76 and 78 and receivers 102 and 104 may take the form of the PDW30 Wireless Bridge of Precision Digital (www.predig.com).

The at least one display may be one of a plurality of display meters disposed at a single location, the display meters being operatively coupled via respective hard-wired connections to the receiver(s) for displaying respective ones of the magnitudes.

What is claimed is:

1. A system for separating solids and liquids of a slurry or suspension, said system comprising: at least one thickener/clarifier; at least one sensor measuring a process parameter or operating parameter of said thickener/clarifier during operation thereof; at least one signal converter operatively coupled via a hard-wired connection to said at least one sensor for converting an output signal thereof to a secondary signal of a predetermined coding format; at least one wireless transmitter operatively coupled via a hard-wired connection to said at least one signal converter for transmitting said secondary signal as a wireless signal; at least one wireless receiver receiving said wireless signal from said at least one transmitter; and at least one display operatively coupled via a hard-wired connection to said at least one receiver for displaying a magnitude of said process parameter or operating parameter measured by said at least one sensor.

2. The system as defined in claim 1 wherein said predetermined coding format is a 4-20 mA analog coding.

3. A system for separating solids and liquids of a slurry or suspension, said system comprising: at least one thickener/clarifier; a plurality of sensors measuring respective process or operating parameters of said thickener/clarifier during operation thereof; a plurality of signal converters operatively coupled via respective hard-wired connections to respective ones of said sensors for converting output signals thereof to secondary signals of a predetermined coding format; a plurality of wireless transmitters operatively coupled via hard-wired connections to respective ones of said signal converters for transmitting said secondary signals as respective wireless signals; at least one wireless receiver receiving said wireless signals from said transmitters; and a plurality of digital display meters operatively coupled via hard-wired connections to said receiver for displaying magnitudes of respective ones of said process or operating parameters measured by said sensors.

4. The system as defined in claim 3 wherein said predetermined coding format is a 4-20 mA analog coding.

5. The system as defined in claim 3 wherein said wireless signals are of different frequencies.

6. The system as defined in claim 3 wherein said thickener/clarifier includes a tank, a rake disposed in said tank, and a drive rotating said rake in a circular path in said tank, said process or operating parameters including torque exerted by said drive and speed of rotation of said rake.

7. The system as defined in claim 3 wherein said display meters are disposed at a single location.

8. A system for separating solids and liquids of a slurry or suspension, said system comprising: at least one thickener/clarifier; a plurality of sensors measuring respective process or operating parameters of said thickener/clarifier during operation thereof and generating respective output signals encoding magnitudes of said process or operating parameters; at least one wireless transmitter operatively coupled via hard-wired connections to said signal converters for transmitting at least one wireless signal carrying said magnitudes in an encoded form; at least one wireless receiver receiving said wireless signal from said at least one wireless transmitter; and at least one display operatively coupled via a hard-wired connection to said receiver for displaying said magnitudes.

9. The system as defined in claim 8 wherein said at least one wireless transmitter transmits said magnitudes via signals of different frequencies.

10. The system as defined in claim 9 wherein said at least one wireless transmitter is one of a plurality of transmitters equal in number to said sensors, each of said transmitters being connected at an input to a respective one of said sensors.

11. The system as defined in claim 8 wherein said encoded form is a 4-20 mA analog coding.

12. The system as defined in claim 8 wherein said thickener/clarifier includes a tank, a rake disposed in said tank, and a drive rotating said rake in a circular path in said tank, said process or operating parameters including torque exerted by said drive and speed of rotation of said rake.

13. The system as defined in claim 8 wherein said at least one display includes a plurality of display meters disposed at a single location, said display meters being operatively coupled via respective hard-wired connections to said receiver for displaying respective ones of said magnitudes.

* * * * *